March 30, 1948.  E. W. JACKSON  2,438,607
BORING ATTACHMENT
Filed Oct. 14, 1944

INVENTOR.
Ernest W. Jackson
BY

Patented Mar. 30, 1948

2,438,607

UNITED STATES PATENT OFFICE 2,438,607

BORING ATTACHMENT

Ernest W. Jackson, Bellflower, Calif.

Application October 14, 1944, Serial No. 558,675

5 Claims. (Cl. 279—6)

This invention relates to boring attachments, or boring heads, for milling machines, and it has among its salient objects to provide certain improvements and simplifications in the construction and arrangement thereof as will make for economy of manufacture and efficiency in operation; to provide in a boring head a plurality of tool holding bores, said bores being in a part of said head which is laterally adjustable with precision, for determining different operating positions of the tool; to provide in combination with the tool receiving bores, a transverse tool-receiving slot in which a tool can be placed and adjustably held, being adjustable lengthwise, but transversely of said boring head, thus giving greater capacity to the head, as will be pointed out in the course of the detailed description thereof.

Other objects and advantages will appear from the following description of one practical embodiment of my invention, taken in connection with the accompanying sheet of drawings, in which.

Figure 1:
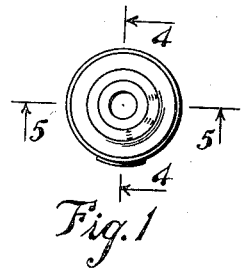
Figure 1 is a plan view, looking endwise, of a boring head embodying my invention.

Referring now in detail to the drawings, I will describe the boring head here shown for illustrative purposes. In the drawing, I have shown an arbor or spindle 10, with screw connection at 11, with a body 12. The arbor is provided with a bore 13 and the body is provided with a bore 14 to receive tools for turning said parts together tightly.

Figure 5:
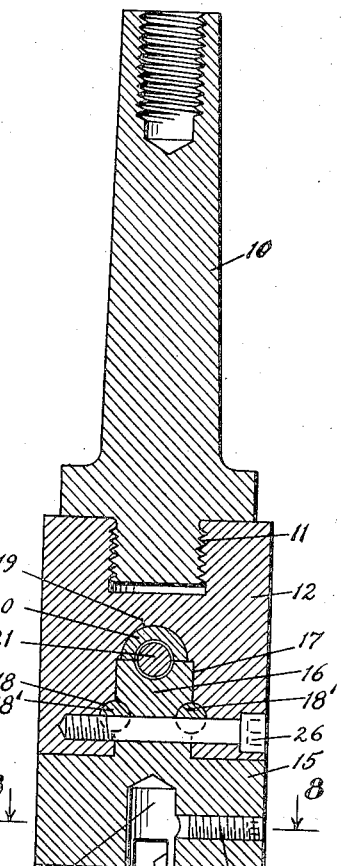
Figure 5 is a similar view taken on the line 5—5, Fig. 1.

The body 12 is formed in two parts, a lower part designated 15, has a middle extension 16, fitted into a corresponding recess 17, extending into and across the body 12, in a manner which will be understood from the sectional view in Fig. 5, and whereby the lower body part 15 and the extension 16, will slide smoothly transversely through the upper body 12.

Two bores 18, 18, are put through the body 12 and the middle extension 16, on the opposite juncture lines, and two close fitting pins 18', 18', are inserted therein. These pins permit the parts to slide relative to each other, as before stated, and also prevent the parts from pulling apart.

Figure 2:
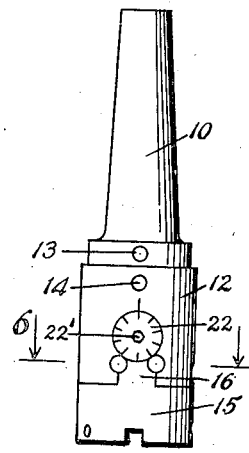
Figure 2 is a side elevation thereof.
Figure 3:
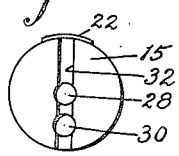
Figure 3 is a bottom plan view thereof.

The body 12, above the extension 16, is also provided with a bore 19, within which movably fits a hemi-sleeve member 20, as shown. This hemi-sleeve member and the top of the extension 16 are threaded to receive an adjustment screw 21, having its head 22 provided with graduations on its outer face, as seen in Fig. 2, and also provided with a wrench socket 22' for turning it. Said screw bolt also is provided with an interlocking collar 23, spaced from its head, to interlocking mesh with the upper body 12, as it fits down over said extension 16, said extension being cut away, as at 24, to give clearance therefor, while the front face of upper body 12 and the extension 16, are countersunk at 25 to receive the head 22, clearly seen in Fig. 4. This hemi-sleeve 20 functions in providing a firm and steady threaded bearing for the adjustment screw between it and the extension 16, and also facilitates assembling said parts.

Figure 4:
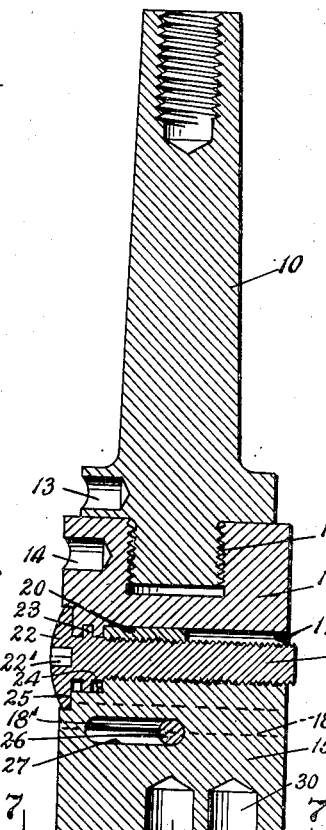
Figure 4 is an enlarged, vertical sectional view through a boring head embodying my invention, taken on the line 4—4, Fig. 1.

The holding pins 18', 18', are seen in light broken lines in Fig. 4. These pins are also interlocked in place by means of a screw bolt 26, inserted from the right hand lower side of the body 12, as seen in Fig. 5, said screw bolt 26 cutting into the under sides of said pins in the manner indicated, to prevent them from moving endwise. Said interlocking screw bolt 26 rests in an elongated opening 27, in the body extension 16, and seen in the sectional view in Fig. 4, whereby the lower body 15 and its extension 16, can be moved laterally relative to the body 12, by means of the adjusting screw 21, as it is turned in either direction with suitable wrench or tool.

It will be understood, of course, that these adjustments, and the screw action is with precision fit, so that the adjustments are all accurately made.

Figures 6, 7:
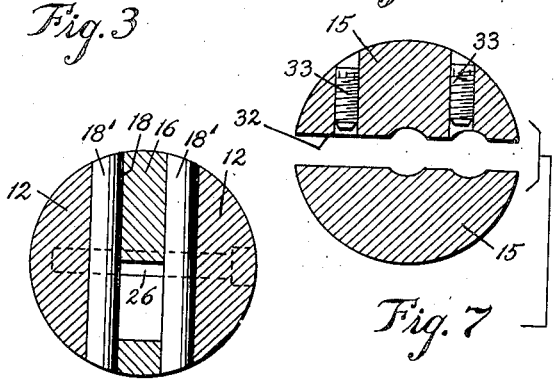
Figure 6 is an enlarged cross sectional view taken on the line 6—6 of Fig. 2.
Figure 7 is a sectional view taken on line 7—7 of Fig. 4.
Figure 8:
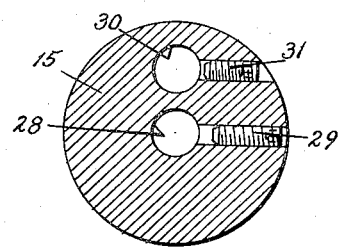
Figure 8 is a sectional view taken on line 8—8 of Fig. 5.

The lower end of the body member 15, is provided with a central bore 28 to receive a boring tool, to be held in place by a set screw 29. There is also in said body member 15, another bore 30, to receive a boring tool, to be held in place by a set screw 31. These bores 28 and 30 are deep enough, as will be clear from the sectional views in Figs. 4 and 5, to leave room for a transverse channel or slot 32, across the lower end of said head, or body member 15, as shown, intersecting said bores 28 and 30 in the manner indicated. This makes provision for inserting a boring or cutting tool, lengthwise in said slot, to project such distance as may be required, said cutting tool being held in place by two set screws 33, 33, Fig. 7. This slot or groove, it will be noted, is parallel with the movement of the lower body member 15, and the extension 16, laterally relative to the upper member 12, thus making it possible to adjust said boring head 15 with micrometric accuracy and precision.

A boring or cutting tool placed in bore 28, concentric with the tool proper can be adjusted laterally by moving the head body 15 laterally as far as the capacity of the screw 21. The head part 15 can then be returned and the tool transferred to the bore 30, and thus operated with increased capacity. Following this adjustment, said tool can be removed, and another tool placed lengthwise in the slot 32, such as will enable the operator to carry the operation much further, as the case may be.

Thus I have provided a boring head with plural bores for tools, and also with a groove or slot for holding a boring or cutting tool lengthwise therein, adjustable therein and also adjustable therewith, with precision means for adjusting the body part 15, which holds the tools, in the manner indicated and described. I do not limit my invention to the details of construction and arrangement here shown for explanatory purposes, except as I may be limited by the hereto appended claims.

I claim:

1. A boring head including two body portions interfitted together for lateral movement relative to each other, two bores into said body portions at and intersecting the junctures of their interfitting portions, two smooth pins fitted into said bores for locking said body portions against separation while permitting lateral adjustment of one portion relative to the other, an adjustment screw threaded between said body portions and operable for moving one portion relative to the other, an arbor on one body portion for connecting it with operating power, the other body portion being provided in its end with tool-holding means.

2. A boring head including two body parts slidably interfitted together and movable laterally relative to each other, one body part having means for connecting it with power and the other body part having tool-receiving and holding means at its operating end, two bores through said two body parts at the juncture lines and two smooth pins fitted into said bores to interlock said parts together and permit relative movement along said pins, an adjustment screw threaded into said body parts, at the juncture line therebetween, and parallel with said pins, said screw being operable for moving one body part relative to the other along said two pins.

3. A boring head including two body parts slidably interfitted together and movable laterally relative to each other, one body part having means for connecting it with power and the other body part having tool-holding means at its operating end, two parallel bores through said body parts at the junctures thereof and two smooth pins fitted into said two bores to interlock said body parts together and permit sliding movement relative to each other, an adjustment screw threaded into said body parts, at the juncture therebetween and parallel with said pins, a hemi-sleeve threaded and fitted over said adjustment screw in one body part and resting at opposite sides of said screw on the other body part, to give threaded bearing for said screw between said body parts, and a screw threaded through said interfitting body parts and said two pins for locking said pins against movement, said inner body part having an elongated opening to move over said screw, when said body parts are moved laterally relative to each other.

4. A boring head of the character referred to including two body parts slidably interfitted together with a rectangular recess in one part and a rectangular extension on the other part and forming parallel juncture faces between said parts, two bores into said body parts on said juncture faces and two smooth pins fitted into said bores to interlock said body parts together and permit sliding movement of one part relative to the other, one body part having means for connecting it with a power member and the other body part having tool holding means in its operating end, an adjustment screw threaded into said body parts at the juncture of the faces at right angles to said parallel juncture faces, a hemi-sleeve threaded and fitted down over said adjustment screw in one body part and resting at opposite sides of said screw upon the juncture face of the other body part, and means interlocking said two smooth pins in place without preventing movement of said body parts relative to each other by said adjustment screw.

5. In a boring head of the character referred to, two body parts interfitted together for sliding movement relative to each other laterally, one body part having a rectangular extension in its middle and across its diameter and the other part having a rectangular recess across its middle to receive said extension, two bores through the juncture lines at opposite sides of said rectangular recess and extension and two smooth pins fitted therein to interlock said body parts together while permitting sliding movement laterally, an adjustment screw threaded into the juncture faces between the inner end of said rectangular extension and said recess, parallel with said pins and operable to move one body part laterally relative to the other along said pins, and means interlocking said pins in place, one of said body parts having an arbor for connecting it with power, and the other body part having tool holding means at its operating end, and graduations on said adjustment screw for determining adjustment movements thereof to move one body part relative to the other body part.

ERNEST W. JACKSON.

REFERENCES CITED

The following references are of record in the file of this patent:

UNITED STATES PATENTS

| Number | Name | Date |
|---|---|---|
| 892,894 | Roman | July 7, 1908 |
| 1,153,673 | Bryant | Sept. 14, 1915 |
| 1,699,837 | Everett | Jan. 22, 1929 |
| 1,718,089 | Tesoroni | June 18, 1929 |
| 1,960,124 | Russell | May 22, 1934 |

OTHER REFERENCES

American Machinist, July 21, 1921, vol. 55, No. 3, page 111.